(12) United States Patent
Alava et al.

(10) Patent No.: US 12,423,394 B1
(45) Date of Patent: Sep. 23, 2025

(54) BIOMETRIC-BASED TRANSMISSION OF EMBEDDED DATA

(71) Applicant: United Services Automobile Association (USAA), San Antonio, TX (US)

(72) Inventors: Galo M. Alava, Tampa, FL (US); Amanda Michelle Boyd, Denver, CO (US); Ramsey Devereaux, San Antonio, TX (US); Gregory Mark Lamontagne, Helotes, TX (US); Elizabeth J. Rubin, San Antonio, TX (US); Brian Tougas, Spring Branch, TX (US); Courtney St. Martin, Forney, TX (US); Michael Kyne, Saint Petersburg, FL (US)

(73) Assignee: United Services Automobile Association (USAA), San Antonio, TX (US)

(*) Notice: Subject to any disclaimer, the term of this patent is extended or adjusted under 35 U.S.C. 154(b) by 499 days.

(21) Appl. No.: 17/721,086

(22) Filed: Apr. 14, 2022

Related U.S. Application Data

(60) Provisional application No. 63/175,145, filed on Apr. 15, 2021.

(51) Int. Cl.
| | |
|---|---|
| *G06F 21/32* | (2013.01) |
| *G06F 21/62* | (2013.01) |
| *G06V 40/70* | (2022.01) |
| *G10L 17/06* | (2013.01) |
| *G10L 19/16* | (2013.01) |

(52) U.S. Cl.
CPC .......... *G06F 21/32* (2013.01); *G06F 21/6218* (2013.01); *G06V 40/70* (2022.01); *G10L 17/06* (2013.01); *G10L 19/167* (2013.01)

(58) Field of Classification Search
CPC ..... G06F 21/32; G06F 21/6218; G06V 40/70; G10L 17/06; G10L 19/167
See application file for complete search history.

(56) References Cited

U.S. PATENT DOCUMENTS

| | | | |
|---|---|---|---|
| 9,619,634 B2* | 4/2017 | Bataller | G06F 21/6218 |
| 10,693,872 B1* | 6/2020 | Larson | H04L 9/3231 |
| 11,115,630 B1* | 9/2021 | Lemberger | G06F 3/167 |
| 11,900,921 B1* | 2/2024 | Gupta | G10L 15/22 |
| 2006/0035625 A1* | 2/2006 | Shin | H04M 3/533 455/411 |
| 2020/0151601 A1* | 5/2020 | Niewczas | H04L 67/53 |
| 2021/0326421 A1* | 10/2021 | Khoury | G10L 17/08 |
| 2021/0343284 A1* | 11/2021 | Fainberg | G10L 15/30 |
| 2022/0277070 A1* | 9/2022 | Robert Jose | H04L 63/0861 |

* cited by examiner

*Primary Examiner* — Han Yang
(74) *Attorney, Agent, or Firm* — Fletcher Yoder, P.C.

(57) ABSTRACT

An embedded data transmission system includes a biometric sensor and a controller comprising a processor and memory configured to receive biometric data input via the biometric sensor. The controller is also configured to identify personal audio data corresponding to the biometric data input based on a database including one or more associations of biometric data and audio data, and, in response to identifying the personal audio corresponding to the biometric data input, submit the personal audio data.

20 Claims, 4 Drawing Sheets

BIOMETRIC-BASED TRANSMISSION OF EMBEDDED DATA

CROSS-REFERENCE TO RELATED APPLICATION

This application claims priority to and benefit of U.S. Provisional Patent Application Ser. No. 63/175,145, titled "BIOMETRIC-BASED TRANSMISSION OF EMBEDDED DATA," filed on Apr. 15, 2021, the entirety of which is incorporated by reference into the present disclosure.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Remote communication methods are ubiquitous in modern business and personal applications. However, despite the many recent advances in this area, security remains a widespread issue. It is common for users of remote communication methods to need to communicate in environments that are not conducive to the verbal communication of sensitive information. These environments may be public spaces where verbalizing important personal information can be risky, loud areas where accurately relaying specific details like numbers, spellings, and the like may be difficult, or any other environments where verbal communication is not ideal. Messaging technology has advanced in recent decades to the point that sending text, numbers, or string messages without speaking is simple. However, there are many situations in which verbal communication is required or preferred. Simultaneously, the advent of certain technologies associated with remote communication has made identifying remote users difficult. Often a user may need a means of confirming another user's identity. Because of situations like these, there is a need in the communication world for improved remote communication and authentication techniques.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an embedded data transmission system includes a biometric sensor and a controller comprising a processor and memory configured to receive biometric data input via the biometric sensor. The controller is also configured to identify personal audio data corresponding to the biometric data input based on a database including one or more associations of biometric data and audio data, and, in response to identifying the personal audio corresponding to the biometric data input, submit the personal audio data.

In another embodiment, a method for transmitting embedded data includes receiving, via a controller, biometric data input via a biometric sensor and identifying, via the controller, personal audio data corresponding to the biometric data input based on a database including one or more associations of biometric data and audio data. The method also includes, in response to identifying the personal audio corresponding to the biometric data input, submitting, via the controller, the personal audio data.

In yet another embodiment, a tangible, non-transitory, computer-readable medium, includes computer-readable instructions that, when executed by one or more processors, cause the one or more processors to associate personal audio data with biometric data, receive a request for submission of the personal audio data, receive biometric data input via a biometric sensor in response to the request, determine whether the biometric data input corresponds to the biometric data, and in response to determining the biometric data input corresponds to the biometric data, submit the personal audio data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to systems and methods for remotely communicating data during a remote audio call. More specifically, the present disclosure relates to systems and methods for facilitating private communication by non-verbally initiating communication of specified data, such as audio data indicative of personal information. Present embodiments may be employed to facilitate confidential communications in environments that necessitate discretion or that would otherwise make it beneficial to initiate communication of data without verbalizing the same data. Further, present embodiments may incorporate authentication techniques as integral aspects of the communications to authenticate the communications efficiently.

As noted above, there are circumstances in which verbal communication is not ideal. A need for discretion, a loud environment, or another applicable scenario may necessitate a means of speechless data communication, including speechless audio data communication. For example, if a user is conversing with a banking official over the phone, the banking official may ask for a piece of personal information (e.g. the user's social security number) for clerical use. If the user is in a crowded area, the user may not want to audibly disclose such sensitive data, or the ambient noise may make accurately communicating sensitive data difficult. Furthermore, the situation may necessitate confirming that the user is the person to whom the sensitive data corresponds. One way to confirm a user's identity is through biometric data specific to each individual. For example, voice recognition may be utilized to associate data with an individual.

Accordingly, it is presently recognized that it would be beneficial to provide a system for nonverbally initiating communication of sensitive data based on biometric data input. The system may include a user device communicating with an external communication device. The external communication device, through a verbal prompt (e.g., given by a human user) and/or through a digital message, may request that the user provide a piece of sensitive personal information. In case of a situation like the one described above, the user device may have the requested sensitive personal information stored in a digital format, which may be an audio format or the like. The user device may also, for the sake of security, have stored biometric data that is required as an input in order to send the sensitive personal information to the external communication device. This biometric data may be input using a biometric reader device either integrally attached to the user device, or externally connected to the user device.

In order to be prepared for the situation described above, the user may pre-store personal information and biometric data on the user device. The user may either choose the type of personal information they wish to input from a list of common information types, or may input a customized title for the personal information. The user may either type in the details of the personal information into the user device, or record an audio message, which the user device stores. For example, the user may indicate to their device that they wish to input their social security number (SSN). The user may then type in their SSN or record an audio message where they dictate the number. The user may also input biometric data that may be used to authorize sending the stored personal data. In a process similar to the one described above, the user may input the type of biometric data they wish to input, then input the biometric data using a biometric reader. For example, a user may indicate that they wish to input a retinal scan, then input the data using a retinal scanner attached to the user device. Additionally, the user may associate a specific piece of personal information with a specific piece of biometric data. For example, the user may wish to associate their SSN with their retinal scan, and may do so using the user device. The user may even associate multiple different pieces of personal information with multiple respective pieces of biometric data (e.g. a left eye retinal scan may be used for SSN, a right thumbprint may be used for birth date).

When each of these components are put together, a scenario may look like the following example. A user may be communicating, via a voice call using a smartphone, with a banker. In order to confirm account information, the banker may request the user's birth date. The user may prefer not to speak their birthday aloud due to their surroundings. Accordingly, the user may provide this data without speaking. Specifically, for example, the user may input their right thumbprint via a fingerprint recognition sensor of the smartphone. In an embodiment, the user may even be prompted to do this based on recognition of the request by the user device. Upon authentication of the thumbprint and confirmation of association of the thumbprint with data indicative of the birthdate (e.g., an audio message of the user dictating their birthdate), the user device may send data indicative of the birthdate to the banker via the smartphone. It should be appreciated that this is only one example of the system's use.

Figure 1:
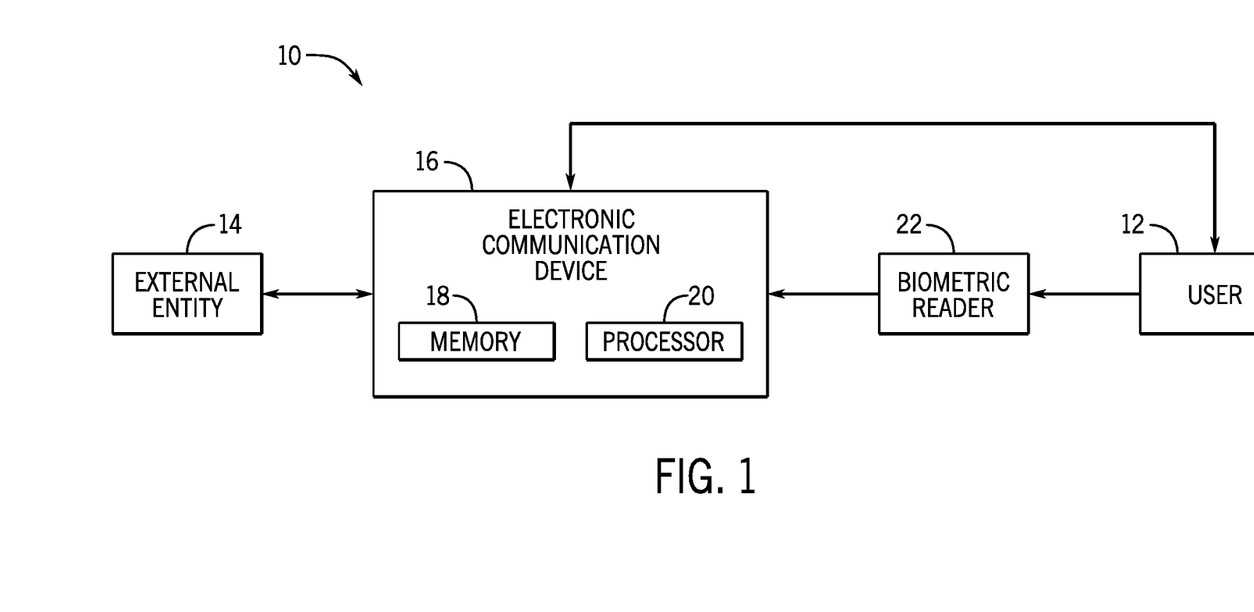
FIG. 1 illustrates a block diagram of a biometric-based embedded data communication system, in accordance with embodiments described herein.

With this in mind, FIG. 1 is a block diagram of a system 10 in which a user 12 may communicate sensitive data to an external entity 14 via an electronic communication device 16 (e.g., a controller), in accordance with an embodiment of the present disclosure. The electronic communication device 16 may contain a memory 18 and a processor 20, and may be designed to be prompted to communicate sensitive data to the external entity 14 by verbal input from the user 12, by data received from a reader 22 (e.g., a biometric reader), by other input mechanisms, or a combination thereof. It should be noted that the reader 22 may broadly include a sensor (e.g., an image sensor, such as a camera, an audio sensor, or a motion sensor) for detecting various types of data, such as imagery (e.g., a fingerprint), relationships within imagery (e.g., motions of a body in a video or spacing between facial features in an image), or a series of motions.

The user 12 may be any person in possession of data (e.g., sensitive personal data) to be communicated to the external entity 14. The user 12 may need to communicate sensitive personal data to the external entity 14 or a number of external entities. This data may be sensitive due to a personal significance the user 12 attaches to it, business value, a desire by the user 12 to keep it to himself or a select few confidants, or the like. The user 12, when prompted to share the data with the external entity 14, may find himself in a situation that is not ideal for verbal communication. For instance, the user may be near an untrustworthy individual, or in a crowded area full of strangers. Alternatively, the user may not wish to hide the sensitive personal data from anyone, but the area may be so loud that it is difficult to verbally communicate the sensitive data, which may be a numerical code, an uncommon name, or any other piece of data for which precise communication is important. Specific details concerning the user 12 and the sensitive personal data may vary depending on the external entity 14.

The user 12 may communicate the sensitive personal data in a number of different ways to the external entity 14, which may be a variety of different things. For example, the external entity 14 may be an employee of business with which the user 12 deals (e.g., an insurance company, a bank, a financial advisor). The sensitive personal data in this scenario may be personal information (e.g., a birth date, an account number, a password, a security question answer, an address, a family member's information, income information, a SSN, a phone number) used for registration with the business, confirmation of information during a regular interaction, or the like. Alternatively, the external entity may be a professional, such as a doctor or an attorney, with whom the user 12 may share personal information (e.g., health history). The external entity 14 may also be a friend or family member. In this case, the sensitive personal data may be information the user 12 is only comfortable sharing with a trusted person, such as personal details or information pertaining to a surprise for someone in the same room as the user 12. Regardless of scenario, the user 12 and the external entity 14 may communicate through a means that may take a variety of forms.

Communication between the user 12 and the external entity 14 may take place via the electronic communication device 16. The electronic communication device 16 may be a smart phone, a smart speaker, a personal computer, or the like. It may provide an audio communication service (e.g., a telephone calling service, a web-based audio service, a video chat service, a device application service) to allow the user 12 to communicate with the external entity 14 via its own audio communication device. The electronic communication device 16 may communicate between the external entity 14 via a Wi-Fi network, a 4G network, a 4G LTE network, a 5G network, a Local Area Network (LAN), or the like. It may receive verbal communications from the user 12 via a microphone device attached integrally to the smart device, an external microphone device attached by wire, or an external microphone device attached wirelessly via a Bluetooth network, a Near Field Communication (NFC) network, or the like. The electronic communication device 16 may also have a number of other integral sensors and devices such as a touch screen, a temperature reading device, an accelerometer, etc. Additionally, the electronic communication device 16 may receive information from other sources such as an entity separate from the user 12 and the external entity 14. For example, the reader 22 may communicate information to the electronic communication device 16 concurrently with the user 12 and the external entity 14. The electronic communication device 16 may be used to communicate sensitive data between the user 12 and the external entity 14. It may also send sensitive personal data in response to an input by the reader 22.

The memory 18 and the processor 20 of the electronic communication device 16 cooperate to facilitate operation of the electronic communication device 16 in accordance with presently disclosed techniques to provide efficient and secure electronic communications. Thus, present embodiments improve operational aspects of traditional electronic communication devices. For example, the processor 20 may perform operations disclosed herein, based on instructions stored in the memory 18, to communicate sensitive data without requiring verbalization of the sensitive data and/or in conjunction with providing authentication. The memory 18 storing such instructions may be any suitable article(s) of manufacture that can serve as media to store processor-executable code, data, or the like. These articles of manufacture may represent computer-readable media or non-transitory (not a mere signal) computer readable media (e.g., any suitable form of memory or storage) that may store the processor-executable code used by the processor 20 to perform the presently disclosed techniques. The memory 18 may also be used to store data described herein (e.g., sensitive data, biometric data, public data), various other software applications for analyzing data, and the like. The processor 20, which operates based on the instructions (e.g., processor-executable code) stored in the memory, may be any type of computer processor or microprocessor capable of executing computer-executable code. The processor 20 may also represent multiple processors that may cooperate to perform operations described herein.

The user 12 may use the reader 22 (e.g., biometric reader) to communicate with the electronic communication device 16. The reader 22 may be a device capable of reading various biometrics to provide biometric results (e.g., a retinal scan, a facial recognition scan, voice recognition, a handprint scan, vein pattern recognition, signature recognition). In some examples, the reader 22 may be an external device (e.g., a fingerprint scanner) connected to the electronic communication device 16 via a wire or wirelessly (e.g., a Wi-Fi network, a 4G network, a 4G LTE network, a 5G network, LAN, a Bluetooth network, an NFC network). The reader 22 may be a device integral to the electronic communication device 16 (e.g., a smart phone camera, a microphone, a touch screen). In accordance with the present disclosure, features of the system 10 may be used to non-verbally communicate sensitive personal data in an efficient manner. Indeed, in accordance with present embodiments, the system 10 increases efficiency of operation relative to the operation of traditional systems by avoiding a need for separate interactions to communicate sensitive data and/or by integrating certain aspects of communication with authentication by embedding or overlapping such communication components.

Figure 2:
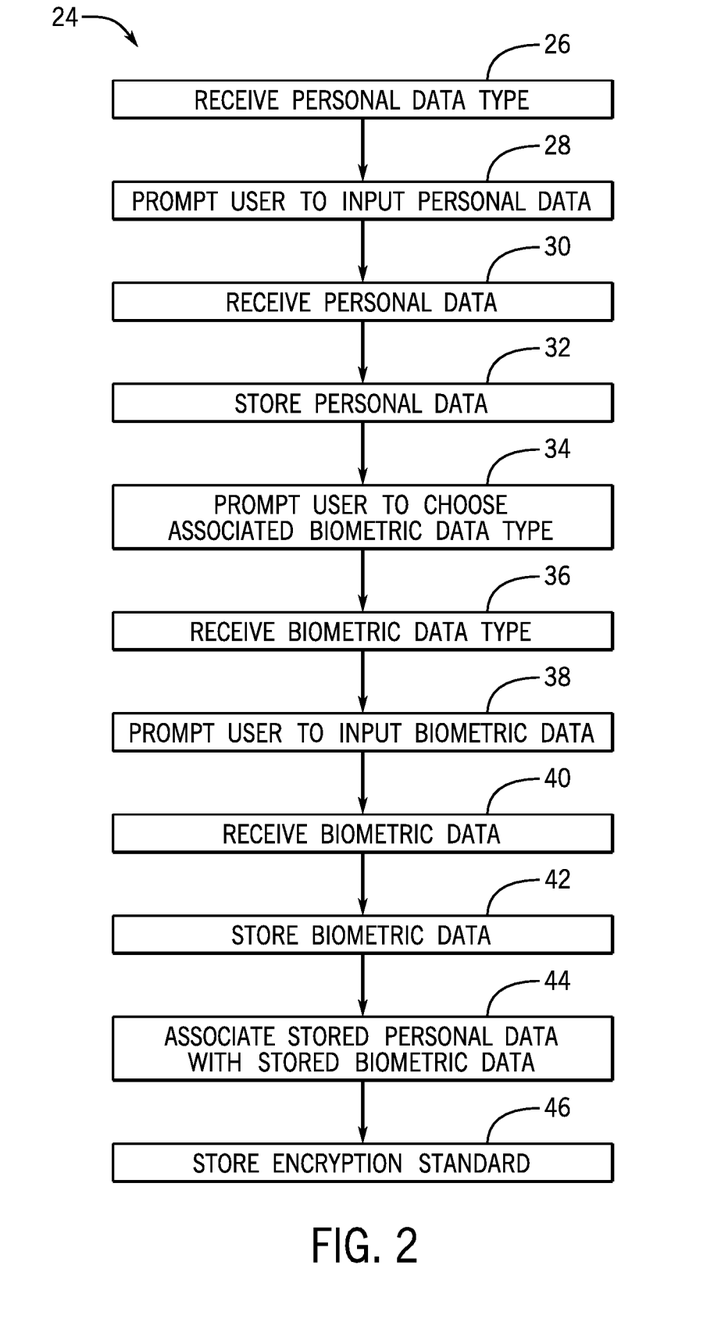
FIG. 2 illustrates a flow diagram of a method for embedding personal data with a biometric input, in accordance with embodiments described herein.

Turning to the next figure, FIG. 2 illustrates a method 24 for associating or embedding a piece of sensitive personal data with a piece of biometric data, in accordance with an embodiment of the present disclosure. Although the following description of the method 24 is described in a particular order, it should be noted that the method 24 is not limited to the depicted order; and, instead, the method 24 may be performed in any suitable order.

At block 26 the electronic communication device 16 receives an indication of a personal data type (e.g., an identifier, a personal identifier, a personal audio identifier). This indication of the personal data type will essentially be an indication of the nature of personal data that is to be provided. For example, block 26 may represent storing numerous different personal data types for later association with personal data. In some embodiments, entry of a personal data type may be before or after entry of personal data. Further, the personal data type may be provided in coordination with providing the personal data, not in a previous operation. The personal data type may be any of a variety of information that is unique to a user (e.g., birth date, SSN, credit card number, personal identification number, card verification code, driver's license number, password, user identification code). For example, a user may input the personal data type as an indication that data subsequently entered should be associated with a phone number, wherein "phone number" is the personal data type. While the illustrated process is directed to indicating a personal data type, the personal data type could be replaced with any of various different data types (personal or public) in accordance with the present disclosure. Further, while not shown as a separate step in the illustrated method 24, an initial authentication may be required to initiate these procedures, such as before entry of a list of available personal data types. For example, the electronic communication device 16 (or any other such device) may receive and confirm a user-input password, process the data using the processor 20, and store the personal data type or types using the memory 18. A user may input the personal data type into the electronic communication device using an input device such as a touch screen, a keypad, a microphone, or the like. In one embodiment, the device may display a menu containing a variety of personal data type options for the user to choose from. In another embodiment, the user may input a customized data type name.

At block 28, the electronic communication device prompts the user to input sensitive personal data, which in other embodiments may be any manner of data. The sensitive personal data may be of a type that corresponds to the personal data type or personal data types input at block 26. For example, if the personal data type (associated with or to be associated with the personal data) is "phone number," then the personal data should be the actual digits of a phone number. As previously noted, in addition to personal data and personal data types, other data types and actual data entries are covered by the present disclosure. The prompt to enter the sensitive personal data may be a visual text message, an audio message, or the like. In an embodiment, after a user has input a personal data type into a device, the device may be configured to display a visual indication for the user to input their unique sensitive personal data associated with that personal data type. The device may block certain device functionalities until the personal data is input. Further, the device may be programmed or operational to indicate that a data entry does not match with a data type, if the data type is already provided and associated with the active input. For example, if a user inputs a name as data associated with a data type indicating a driver's license number, a system in accordance with present embodiments may prompt the user to enter different data that matches a format of the indicated data type.

The electronic communication device, at block 30, receives the sensitive personal data. The sensitive personal data may be sensitive personal audio data (e.g., an authenticated audio recording) contained in a file comprising a recording of the user speaking the prompted personal data. Alternatively, the personal data may be a text file, an image file, or the like. The personal data may be input by a user using a device such as a keypad, a touchscreen keypad, a microphone, a camera capable of photographing personal documents, or the like. Inputting the personal data may cause the prompt described at block 28 to close.

At block 32, the electronic communication device stores the sensitive personal data. The sensitive personal data may be stored in memory or storage, such as the memory 18 referenced in FIG. 1. The personal data may be stored alongside (in an association with) an indicated personal data type, or another piece of data. For example, the personal data and personal data type may be linked by a database (e.g., a database including one or more associations of biometric data and audio data) or metadata assignments may be utilized to link the personal data and the personal data type. In one embodiment, the sensitive personal data is stored alongside a personal data type indicating what type of data the personal data is. A user may use this to retrieve the personal data based on the type of data the user wishes to retrieve. In another embodiment, the sensitive personal data is stored alongside a data type for a separate piece of data a user may want to access using the personal data. For example, a user may store a bank account number alongside the data type "bank statement". The user may then indicate via a device or another suitable system that they wish to retrieve a bank statement. The device may then identify the bank account number associated with this data type and send the bank account number to an external entity that requires the bank account number as confirmation before sending the user the bank statement.

In response to receiving the sensitive personal data (which may occur in a separate session from defining various personal data types), at block 34 the electronic communication device prompts the user to choose a biometric data type to be associated with the stored personal data. The device may display a number of options to choose from. The device may prompt the user to input the biometric data type using an input device (e.g., a touch screen, a keypad, a microphone). At block 36 the electronic communication device receives a biometric data type (e.g., as a selection or direct input). The biometric data type may be any type of data associated with a certain biometric (e.g., fingerprint, retinal pattern, facial structure, voice pattern).

At block 38 the electronic communication device prompts the user to input biometric data. The biometric data may correspond to the biometric data type of block 36. The prompt may be a visual text message, an audio message, a haptic indication, and the like. The prompt may activate a biometric reader. For example, the prompt may be a text display on a device indicating that a user must input a fingerprint on a fingerprint scanner attached to the device. The fingerprint reader may turn on before or after the prompt is displayed, indicating that it is ready for use. The biometric reader may deactivate once the biometric data is input.

The electronic communication device, at block 40, receives biometric data from a user. The data may be input using a biometric reader corresponding to the biometric data type. The biometric reader may be a fingerprint scanner, a facial recognition camera, a handprint scanner, a voice recognition microphone, or the like.

At block 42 the electronic communication device stores received biometric data. The biometric data may be stored in memory or storage, such as the memory 18 referenced in FIG. 1. The biometric data may be stored alongside an indicated biometric data type, or another piece of data.

At block 44, the electronic communication device associates stores sensitive personal data with stored biometric data. Thus, the sensitive personal data and the biometric data are associated or embedded with each other, which facilitates efficiencies associated with present embodiments. The two pieces of data may be stored in such a way that a request for retrieval of one may necessitate the accurate input of the other. For example, the device may associate a stored social security number with a stored right retinal pattern (a retinal pattern for a user's right eye). An external entity may request the social security number, and the device may require an accurate input of the stored right retinal pattern for the device to send the external entity the social security number. In certain embodiments, the electronic communication device may receive the biometric data via the sensor and associate it with the sensitive personal data as part of a calibration operation of the controller.

At Block 46, the electronic communication device sets an encryption standard. The encryption standard may be a similarity standard for a biometric input necessary for enabling access to an associated piece of personal data. The encryption standard may be set by the user or some other entity. For example, a device may store a birth date associated with a stored left thumb print. A user may set the encryption standard at 90%, meaning that in order to access the birth date, the user must input a left thumbprint that is 90% similar to the stored one. The encryption standard may be a similarity percentage (e.g., a required similarity percentage), a set of minimum detected features, or any other technique or procedure of comparing two pieces of biometric data. The encryption standard may allow for secure personal data retrieval.

Figure 3:
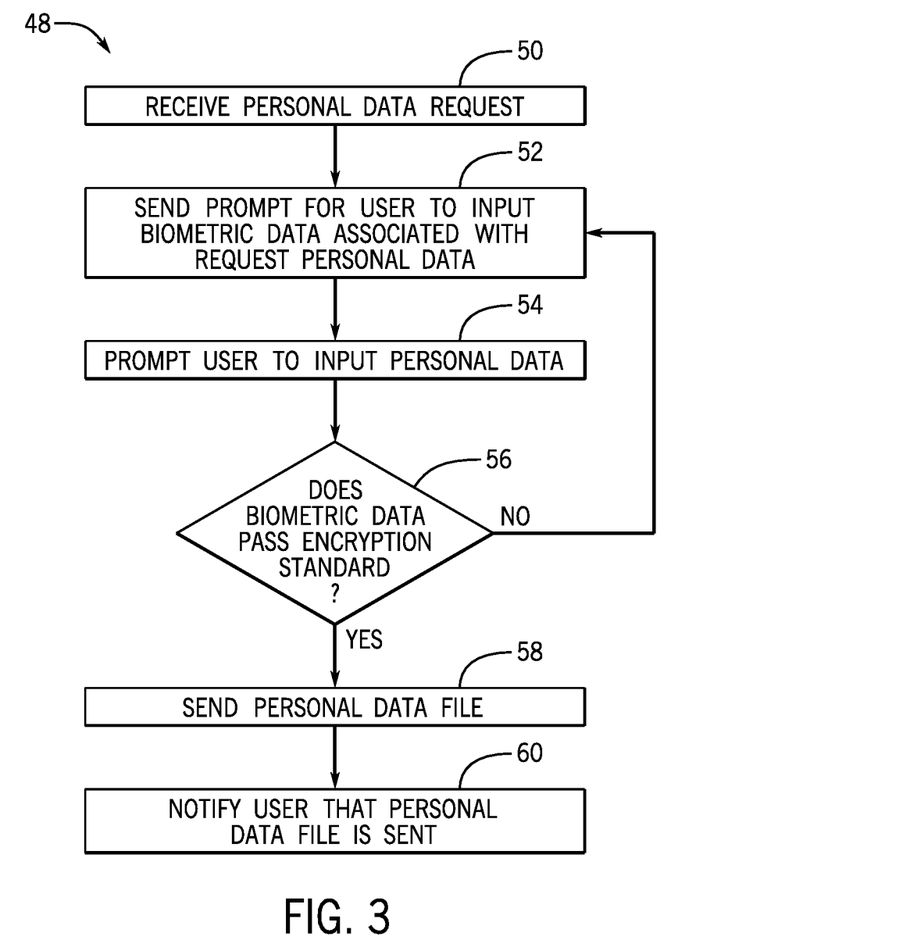
FIG. 3 illustrates a flow diagram of a method for sending embedded personal data based on a biometric input, in accordance with embodiments described herein.

With this in mind, FIG. 3 illustrates a method 48 for nonverbal communication of personal data, in accordance with an embodiment of the present disclosure. Although the following description of the method 24 is described in a particular order, it should be noted that the method 24 is not limited to the depicted order; and, instead, the method 24 may be performed in any suitable order.

At block 50 the electronic communication device receives a personal data request (e.g., a request for the personal audio data). The personal data request may be from an external device, such as external entity 14 referenced in FIG. 1. The external device may be an audio communication device such as a smart phone, an audio communication application on a computer, or the like. The external device may be used by an entity such as an employee of a company to communicate with a user. For example, a user may communicate with a bank official using a smart phone. The banking official may request the user's social security number either verbally or electronically. The request may be made during an ongoing phone call. In certain embodiments, the device may parse the request into components, including one or more key words. The device may use the one or more key words to facilitate identifying the personal audio data that corresponds to the biometric data input by identifying a correlation between the one or more key words and the personal audio data or the biometric data input in the database, which includes one or more associations of words, biometric data, and audio data.

At block 52, the electronic communication device sends a prompt for the user to input biometric data (e.g., additional biometric data) associated with the requested personal data. The biometric data may be associated with the requested personal data of block 50, as described at block 44 of FIG. 2. The biometric data may be a retinal scan, a facial recognition scan, voice recognition, a handprint scan, vein pattern recognition, signature recognition, or the like. The prompt may be an audio message inserted into the ongoing phone call, a visual prompt on the screen of the smartphone, or any sufficient communication. The prompt may name a specific biometric input or request any biometric input from the user. In some embodiments, the prompt may simply request the personal data by textually or audibly noting the request (e.g., "Please provide your home address"). In such embodiments, an additional layer of authentication may be provided in that the user must know which biometric to use to communicate their home address (or other personal data).

At block 54, the electronic communication device receives the biometric data. The data may be received from a biometric reader either integrally attached or temporarily connected to the device. The biometric data may consist of one or more biometric readings. For example, a user may, upon prompting, scan their face with a facial recognition scanner. The scanner may record several pieces of data and analyze each for similarity in the case that one piece of data is defective.

The electronic communication device, at block 56 checks whether the biometric data passes the encryption standard. The device may compare the input biometric data to the stored biometric data of block 42, as discussed at block 44. For example, the device may store a fingerprint scan associated with a birth date. The user may have set an encryption standard of 85% similarity, meaning that to access the birth date, a user would have to input a fingerprint scan that is at least 85% similar to the stored fingerprint data associated with the birth date. The device could compare each of the several pieces of biometric data input at block 54 to the stored biometric data. In one embodiment, the device could allow access to the stored personal data if any of the pieces of biometric data pass the encryption standard. In another embodiment, the device could allow access only if a set number (e.g., three out of five) of the pieces of biometric data pass the encryption standard. If the input biometric data does not pass the encryption standard, the device prompts the user to input the biometric data again and the method reverts to block 52. In certain embodiments, the device may send (e.g., display, submit) an error signal. If the input biometric data passes the encryption standard, the method continues at block 58.

Block 58 details the electronic communication device sending associated data (e.g., a personal data file). The data may be sent in response to the device determining that the input biometric data passes the encryption standard as described at block 56. The data may contain the stored personal data described at block 32, which may also be the requested personal data of block 50. The data may be sent to a device owned by the external user who requested the personal data, or may be communicated directly over a phone call if the personal data file contains an audio recording. In an alternative embodiment, the personal data file may be a confirmation of the user's identity that does not contain the sensitive personal data.

At block 60, the electronic communication device notifies the user that the personal data file has been sent. The device may notify the user via a visual text message, an audio message, or the like. The device may also send a similar notification to the external entity that receives the personal data file.

Figure 4:
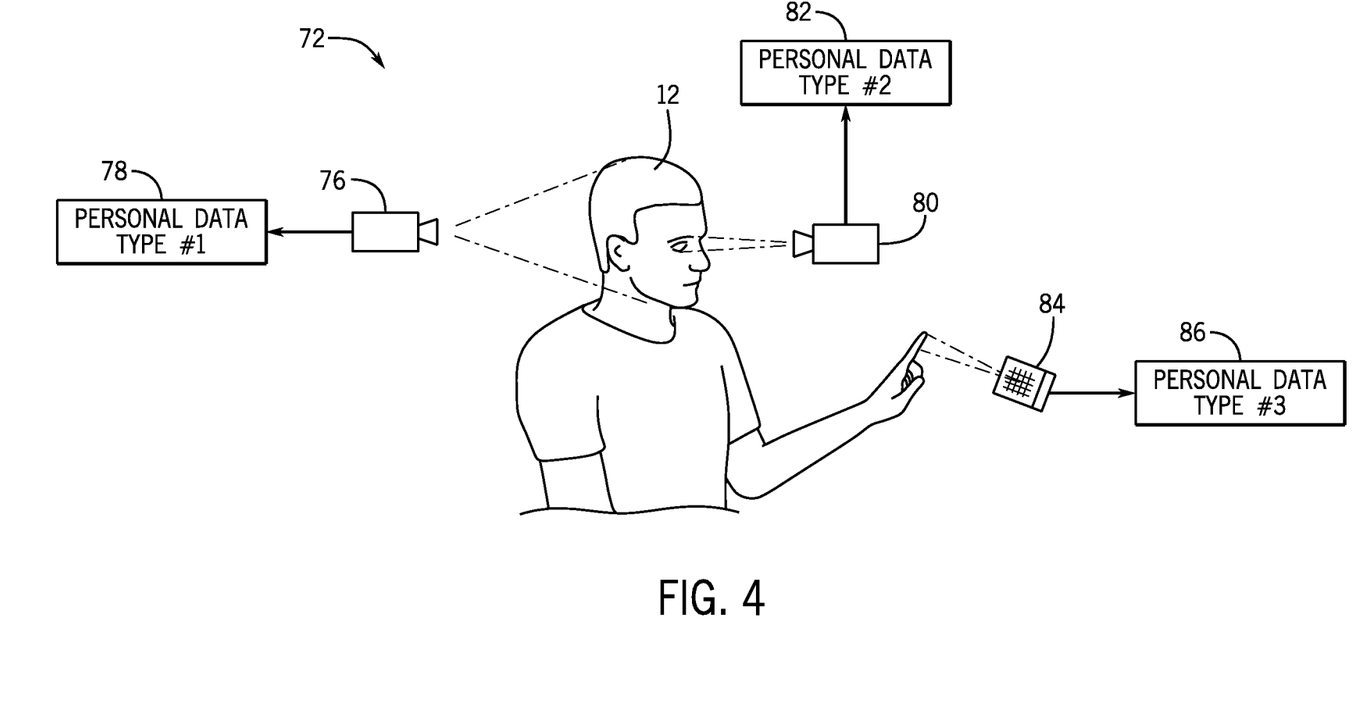
FIG. 4 illustrates a system for communicating embedded personal data associated with specific biometric data, in accordance with embodiments described herein.

FIG. 4 illustrates a system 72 for communicating different types of personal data based on different possible biometric inputs, in accordance with embodiments of the present disclosure. Each of the illustrated biometric readers may read a specific biometric from the user 12 to send a specific personal data type.

A variety of biometric readers may prompt a device to send personal data based on the type of biometric data they scan, which may include combinations and/or patterns of biometric data (e.g., a fingerprint scan followed by facial recognition scan). For example, a user may wish to nonverbally communicate a specific piece of sensitive personal data to an external entity. The user may receive a request for the specific piece of personal data, or may wish to trigger the sending of that piece of data through a specific biometric input. The user may then send the piece of data in a variety of ways.

In one embodiment, the user may receive a request for a piece of personal data of a specific personal data type. For example, the user may be speaking with a bank employee telephonically, and the employee may send a digital request for personal data of the first personal data type 78. The user may respond with the information corresponding to the requested information type by inputting a facial recognition scan using the facial scanner 76. Based on biometric data and personal data associations, the appropriate data may be transmitted upon confirmation of the appropriate input (e.g., a high level confirmation that a fingerprint was entered or a detailed confirmation that the user's thumb print was entered). In some situations, the employee of the bank may not actually be informed about the data being requested and/or entered. For example, the employee may only know to ask for a fingerprint scan without knowing or seeing that the response includes a password or other personal data. In an embodiment, the user may not be the owner of the sensitive personal data, but rather a trusted user who the owner of the data gave authority to convey sensitive personal data to external entities without knowing the data itself.

In another embodiment, the user may independently initiate the personal data sending process by inputting a piece of biometric data of a certain biometric data type. The user may be speaking with the bank employee of the previous example using a smart phone. Without a prompt, the user may initiate discussion of a matter relating to the second personal data type 82 by inputting a retinal scan using retinal scanner 80.

In yet another embodiment, the external entity may request a piece of personal data and may require the input of a piece of biometric data of the correct type as confirmation that the user is the correct user. The user may be prompted to input the piece of biometric data of the biometric data type associated with the third personal data type 86. For example, the user 12 may be prompted to input a piece of biometric data of the biometric data type associated with the user's birth date. The user may then recall that he previously associated a fingerprint scan with his birthdate, then input the appropriate piece of biometric data into fingerprint scanner 84.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An embedded data transmission system, comprising:
   a biometric sensor; and
   a controller comprising a processor and memory configured to:
      receive a request for submission of personal data of a user;
      identify a biometric data input type that corresponds with a personal data type of the personal data;
      output a prompt for input of biometric data of the biometric data input type by the user based on identifying the biometric data input type;
      receive biometric data input of the user via the biometric sensor in response to the prompt; and
      in response to identifying personal audio data corresponding to the biometric data input based on a database including an association of biometric data and the personal audio data and authenticating the biometric data input of the user, submit the personal audio data, wherein the personal audio data comprises an authenticated audio recording of the user.

2. The embedded data transmission system of claim 1, wherein the processor and memory are configured to:
   receive additional biometric data input via the biometric sensor;
   determine a lack of correspondence between the additional biometric data input and the personal audio data; and
   in response to determining the lack of correspondence, submit an error signal.

3. The embedded data transmission system of claim 1, wherein
   the biometric data input type is stored, via memory, in association with the personal data type.

4. The embedded data transmission system of claim 1, wherein the request is received as audio input, and wherein the processor and the memory are configured to:
   parse the request into components including one or more key words; and
   use the one or more key words to facilitate identifying the personal data type by identifying a correlation between the one or more key words and the personal audio data stored in the database.

5. The embedded data transmission system of claim 1, wherein the processor and memory are configured to receive the personal audio data, receive the personal data type, and associate the personal audio data with the personal data type in the database.

6. The embedded data transmission system of claim 1, wherein the processor and memory are configured to receive the biometric data via the biometric sensor and associate the biometric data with the personal audio data as part of a calibration operation of the controller.

7. The embedded data transmission system of claim 1, wherein the processor and memory are configured to determine the biometric data input corresponds to a specific piece of the biometric data by comparing the biometric data with the biometric data input and confirming comparison results pass an encryption standard, wherein the encryption standard includes a required similarity percentage.

8. The embedded data transmission system of claim 1, wherein the authenticated audio recording of the user comprises a recording of the user speaking prompted personal data, a birth date, an account number, a password, a security question answer, an address, a family member's information, income information, a social security number, a phone number, or health history.

9. The embedded data transmission system of claim 1, wherein the biometric data input type comprises a fingerprint, a retinal pattern, a facial recognition scan, a voice recognition, a handprint scan, a vein pattern recognition, or a signature recognition.

10. A method for transmitting embedded data, comprising:
  receiving a request for submission of personal data of a user;
  identifying a biometric data input type that corresponds with a personal data type of the personal data;
  outputting a prompt for input of biometric data of the biometric data input type by the user based on identifying the biometric data input type;
  receiving, via a controller, biometric data input of the user via a biometric sensor in response to the prompt; and
  in response to identifying, via the controller, personal audio data corresponding to the biometric data input based on a database including an association of biometric data and the personal audio data and authenticating, via the controller, the biometric data input of the user, submitting, via the controller, the personal audio data, wherein the personal audio data comprises an authenticated audio recording of the user.

11. The method of claim 10, comprising:
  receiving, via the controller, additional biometric data input via the biometric sensor;
  determining, via the controller, a lack of correspondence between the additional biometric data input and the personal audio data; and
  in response to determining the lack of correspondence, submitting, via the controller, an error signal.

12. The method of claim 10, wherein the biometric data input type comprises a fingerprint, a retinal pattern, a facial recognition scan, a voice recognition, a handprint scan, a vein pattern recognition, or a signature recognition.

13. The method of claim 10, comprising sending, via the controller, a notification to a device associated with the user, wherein the notification indicates that the personal audio data has been submitted.

14. The method of claim 10, wherein the request comprises an audio input.

15. The method of claim 14, comprising:
  parsing, via the controller, the request into components including one or more key words; and
  using the one or more key words to facilitate identifying the personal data type by identifying a correlation between the one or more key words and the personal audio data in the database.

16. A tangible, non-transitory, computer-readable medium, comprising computer-readable instructions that, when executed by one or more processors, cause the one or more processors to:
  associate personal audio data of a user with biometric data of the user, wherein the personal audio data comprises an authenticated audio recording of the user;
  receive a request for submission of personal data of the user;
  identify a biometric data input type that corresponds with a personal data type of the personal data;
  output a prompt for a biometric data input of the biometric data input type by the user based on identifying the biometric data input type;
  receive the biometric data input of the user via a biometric sensor in response to the prompt;
  determine whether the biometric data input corresponds to the biometric data; and
  in response to determining the biometric data input corresponds to the biometric data, submit the personal audio data.

17. The computer-readable medium of claim 16, wherein the biometric data input comprises a plurality of pieces of biometric data.

18. The computer-readable medium of claim 17, wherein determining the biometric data input corresponds to the biometric data comprises determining that a threshold number of the plurality of pieces of biometric data correspond to the biometric data.

19. The computer-readable medium of claim 18, wherein the plurality of pieces of biometric data is a fingerprint, a retinal scan, a facial structure, or a combination thereof.

20. The computer-readable medium of claim 16, comprising computer-readable instructions that, when executed by the one or more processors, cause the one or more processors to receive the personal audio data, receive the personal data type, and associate the personal audio data with the personal data type.

* * * * *